Jan. 10, 1950

R. J. SHAW

VERTICALLY EXTENSIBLE PROJECTION TELEVISION RECEIVER CABINET 2,494,364

Filed Jan. 8, 1947

2 Sheets-Sheet 1

Inventor:
Robert J. Shaw,
by Merton D Morse
His Attorney.

Jan. 10, 1950

R. J. SHAW

VERTICALLY EXTENSIBLE PROJECTION TELEVISION RECEIVER CABINET 2,494,364

Filed Jan. 8, 1947

2 Sheets-Sheet 2

Inventor:
Robert J. Shaw,
by Merton D. Morse
His Attorney.

Patented Jan. 10, 1950 2,494,364

UNITED STATES PATENT OFFICE 2,494,364

VERTICALLY EXTENSIBLE PROJECTION TELEVISION RECEIVER CABINET

Robert J. Shaw, Bridgeport, Conn., assignor to General Electric Company, a corporation of New York Application January 8, 1947, Serial No. 720,700

1 Claim. (Cl. 312—7)

My invention relates to television receivers of the projection type and it has for its primary object to provide certain improvements in the construction and arrangement of the optical components of such a receiver.

It is another object of my invention to provide a projection television receiver in which the viewing screen thereof is mounted on a retractable structure so that it may be enclosed in the cabinet when the receiver is not in use and withdrawn to a viewing position when the receiver is in use.

It is still another object of my invention to provide a new and improved arrangement for a projection television receiver in which the entire optical system, which is built as a unitary structure, is independent of dimensional variations in the cabinet of the receiver.

It is a further object of my invention to provide a new and improved television receiver of the projection type having a retractable viewing screen in which operation of the cathode ray tube is prevented during periods when the viewing screen is not in optimum position for viewing purposes.

It is a still further object of my invention to provide a new and improved cabinet structure in which a lid thereof operates as a follower for a retractable structure within the cabinet and in which the lid is stopped short of a full closed position upon insertion of the retractable structure into the cabinet.

A feature of the invention which is useful in fulfilling the foregoing objects consists in a cabinet structure for a television receiver of the projection type in which the viewing screen is supported on an independent structure which may be raised into a viewing position during the operation of the receiver and lowered into the receiver cabinet during non-operative periods, the raising and lowering of the structure being effected by a slight pressure of the hand. The supporting structure for the viewing screen carries a contact which prevents operation of the cathode ray tube of the receiver except when the screen is in such a position with respect to the remaining components of the optical system that proper focussing of a received television picture is obtained.

Figure 1:
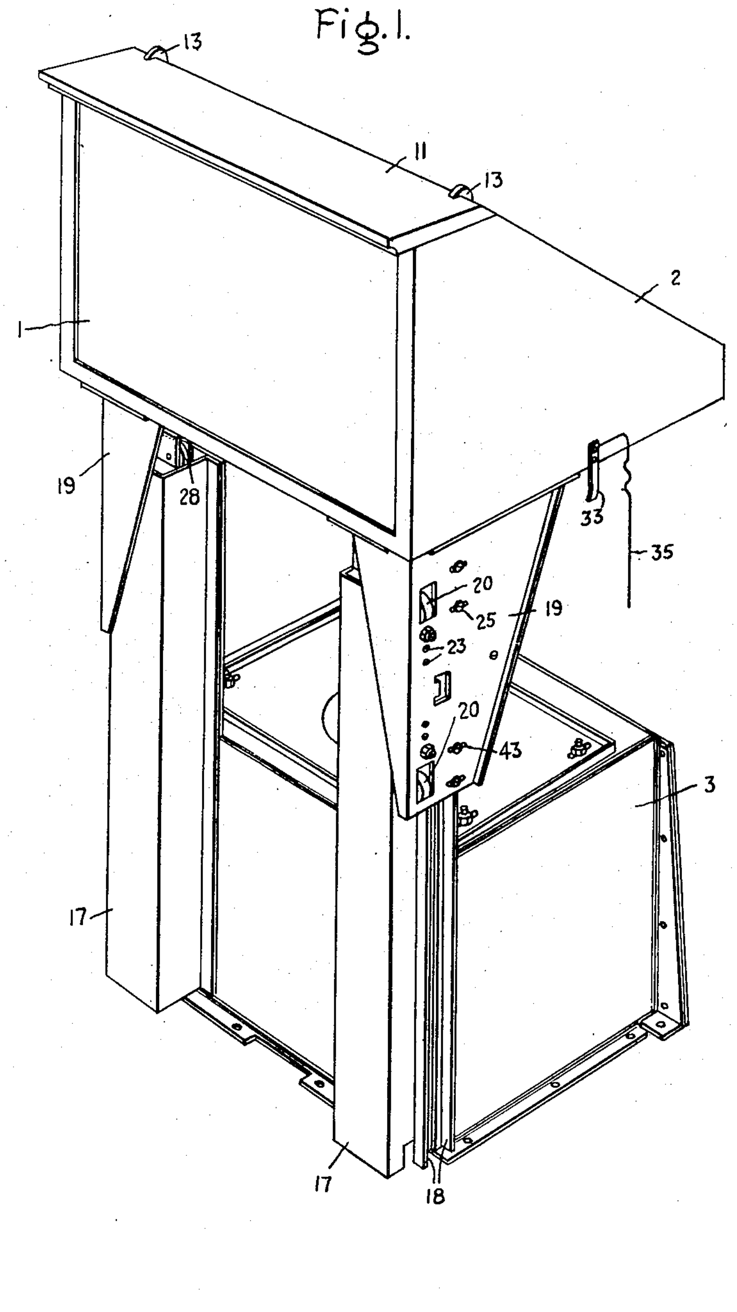
Figures 2, 6, 7:
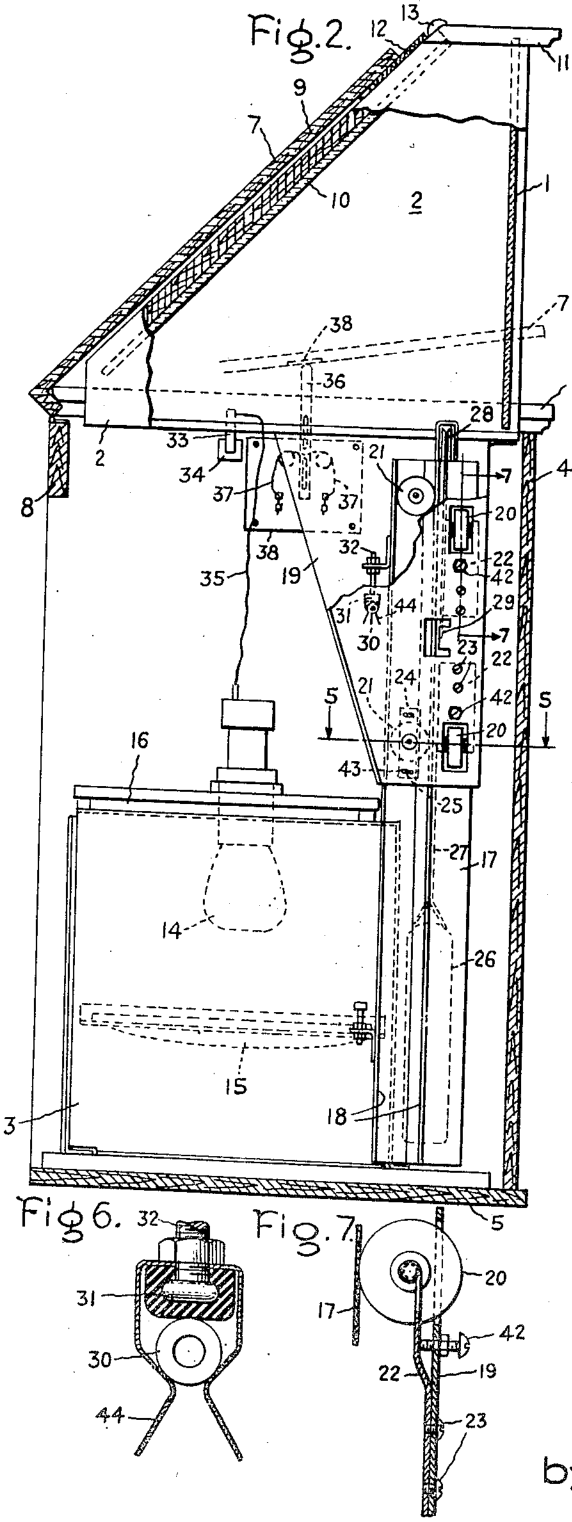
Figure 3:
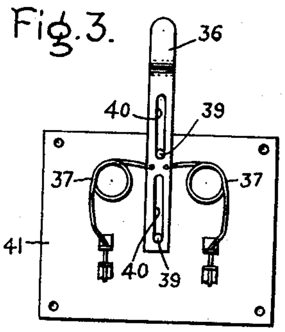
Figure 4:
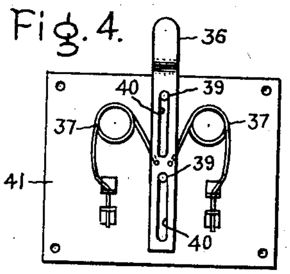
Figure 5:
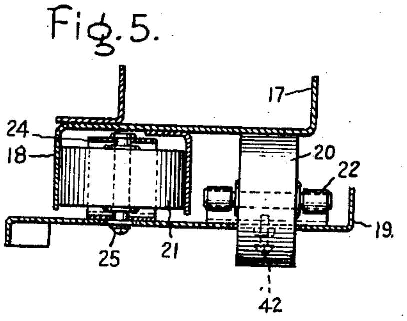

The features which I desire to be protected herein are set forth with particularity in the appended claim. The invention itself, however, together with further objects and advantages thereof, may best be understood by reference to the following description taken in connection with the accompanying drawings in which Fig. 1 is a perspective view of a portion of a projection television receiver illustrating my invention; Fig. 2 is a side elevation view, partly in section, of a receiver embodying my invention; Figs. 3 and 4 are views illustrating, respectively, the open and closed positions of a lid supporting mechanism employed in the structure of Fig. 2; Fig. 5 is a sectional view taken along the lines 5—5 of Fig. 2 showing certain structural details of the receiver of Fig. 2; Fig. 6 illustrates another structural detail of the receiver of Fig. 2; and Fig. 7 is a partial sectional view taken along the lines 7—7 of Fig. 2.

Referring to Fig. 1, I have there shown a perspective view of a structure for supporting the optical components of a projection television receiver which employs an optical system of the Schmidt type and which permits moving the viewing screen of the receiver in a vertical position so it can be withdrawn from an enclosing cabinet. The structure of Fig. 1 comprises a viewing screen 1 which is contained in a housing 2 movable vertically on a supporting elevator system. The remaining optical components of the receiver are enclosed in a rigidly constructed steel cabinet 3 which is arranged to be held in fixed position within a receiver cabinet and from which the housing 2 is so supported that it may be moved vertically with respect to the steel cabinet 3.

Referring now to Fig. 2, the television receiver is illustrated as comprising a wooden cabinet having a front wall 4, a bottom 5, a fixed top portion 6, and a rotatable lid portion 7 adjacent the fixed portion 6 and hinged on a supporting rail 8. The housing 2 comprises a wooden structure having an open bottom and a slanting rear wall 9 on the interior surface of which a flat deflecting mirror 10 is mounted at a 45 deg. angle with respect to the frosted glass viewing screen 1. A top wall 11 completes the housing 2 and is so constructed that, when the housing is lowered into the cabinet by means to be described later, the outer edge of wall 11 forms a portion of the exterior trim of the receiver cabinet. The lid 7, when the housing 2 is in its raised position, is supported by a piece of felt 12 on the outer surface of the slanting wall 9. As the housing 2 is lowered, the lid 7 engages rollers 13 provided at the junction of the top walls 9, 11 and operates as a follower for the housing as it descends to a closed position.

The steel cabinet 3 is attached to the bottom 5 of the television receiver cabinet and supports in fixed relation a cathode ray tube 14 which is mounted with its fluorescent end wall or face downward. Adjustably supported below the cathode ray tube 14 is a parabolic mirror 15 which reflects light from the face of the tube 14 upwardly through an apertured correcting lens 16 arranged about the neck of the cathode ray tube 14. After passing through the correcting lens 16, light from the mirror 15 strikes the inclined mirror 10 from which it is reflected upon the back of the frosted glass viewing screen.

In order that the housing 2 may be moved vertically relative to the steel cabinet 3 to bring the screen 1 to a position above the side wall 4 during periods of operation of the receiver and may be lowered into the cabinet during periods when the receiver is not in use, I provide an elevator mechanism which comprises tubular counterweight channels 17 and roller channels 18, which are mounted at the outer corners of the steel cabinet 3, and trapezoidal mounting brackets 19 attached to the housing 2. Two sets of rollers 20, 21 are supported from each of the mounting brackets 19 for engagement with respective of the channels 17, 18. Rollers 20 are supported from the inner surface of bracket 19 by means of leaf springs 22 and screws 23 for resilient engagement with the outer surface of tubular channels 17. Rollers 21 are supported by means of brackets 24 and screws 25 for engagement with the side walls of the channels 18.

In order that the housing 2 may be raised and lowered with as small a force as possible, I provide counter-weights 26 which are suspended within channels 17 by means of cables 27 passing over pulleys 28 attached to the upper ends of the tubular channels 17. One end of each cable 27 is attached to a counterweight 26 and the opposite end is attached to a bracket 29 formed in the mounting bracket 19. In order to limit the upward movement of the housing 2, I provide a stop 30 attached to the inner surface of bracket 19 and adapted to engage a rubber bumper 31 adjustably supported to the outer surface of channel 18 by means of a bolt and nut arrangement 32.

In the operation of the elevator mechanism of my television receiver, it is apparent that the housing 2 may be raised to a full open position simply by grasping the lower surface of the trim piece 11 with one's fingers and pushing slightly upward thereon. Since the entire housing and its supporting bracket are balanced by means of the counterweights 26, a slight pressure is sufficient to cause the housing to move upward until the screen 1 comes into a position where it is visible above the front panel 4. The lid 7 opens as housing 2 is moved upwardly, sliding along first the rollers 13 and later engaging the felt piece 12. The upward movement of the housing is finally checked by means of the stop 30 engaging bumper 31. The nut and bolt arrangement 32 permits adjustment of the maximum position to which the screen 1 may be raised so that the screen and the picture thereon are fully visible.

In a projection television receiver of this type having a retractable screen, it is desirable that the picture shown on the screen always be in focus. It is apparent that, for any particular optical system as the position of the inclined mirror 10 is varied with respect to the mirror 15 and the correcting lens 16, the focusing of the picture projected upon the screen 1 is affected and the picture may appear distorted if the viewing screen is not raised to substantially its uppermost position. In order to prevent such distortion from being noticeable, I provide means for limiting the energization of the cathode ray tube to periods when the screen 1 is in substantially its highest position. This means comprises a flexible contact 33 attached to the outer surface of the housing 2 and adapted to engage a fixed contact 34 attached to the inner wall of the television cabinet. Contact 33 is connected by means of a flexible lead 35 to the cathode of the picture tube 14 and fixed contact 34 to the circuit of the receiver which supplies operating potential to the cathode or any other controlling electrode of the cathode ray tube.

Lowering of the housing 2 into the television cabinet is effected by a slight finger pressure on the upper surface of the trim piece 11. This slight pressure causes the housing to move smoothly into the cabinet until the viewing screen 1 is completely removed from view. Since the lid 7 follows the downward movement of the housing 2 and the lid, which is of a substantial mass, may cause injury to the operator's fingers by falling thereon when the housing is completely lowered into the cabinet, I provide means for arresting the lid in its downward movement at a position slightly from the fully closed position. This means comprises an upwardly extending rod 36 which is resiliently supported from the inner wall of the cabinet by means of a pair of torsion springs 37 and adapted to engage a recessed strike plate 38 provided in the lid 7. The operation of the lid arresting or checking mechanism becomes more apparent by reference to Figs. 3 and 4 which illustrate, respectively, the positions of the rod 36 when the lid 7 is in open and closed positions. The rod 36 is arranged to slide vertically on bushings 39 which engage slots 40 in the rod. The torsion springs 37 have one end attached to the rod and their opposite ends attached to a mounting plate 41 secured to the surface of the inner wall of the cabinet. After the screen housing is lowered into place and the rod 36 engages the strike plate 38, additional pressure on the cabinet lid 7 overcomes the upward pressure of the springs 37 and forces the rod 36 downwardly to the position shown in Fig. 4. As the rod is forced downwardly, the forces exerted by the springs 37 on the rod develop horizontal components, which cancel each other, and diminish the upward vertical thrust of the springs. When the lid is pressed to its closed position, the vertical thrust of the springs is insufficient to support the weight of the lid, yet remains sufficient to return the rod to its upward position when the lid is subsequently raised.

In Fig. 5, there is shown the manner in which the rollers 20, 21 are adjustably supported so that the viewing screen may be aligned with respect to the optical axis of the optical system of the receiver and the amount of force which is required to raise and lower the housing 2 regulated. The roller 20 is supported from the bracket 19 by means of leaf spring 22. An adjustable pressure screw 42 in screw threaded engagement with the bracket 19 bears against the leaf spring 22 to control the spacing between the bracket 19 and the tubular channel 17. Since, as is apparent from an inspection of Fig. 1, brackets 19 are provided on opposite sides of the housing 2, by controlling the spacing of each of leaf springs 22 relative to its respective bracket 19, the housing and the viewing screen 1 may be adjusted relative to the optical axis of the receiver.

In Fig. 5 there is shown likewise the manner in which rollers 21 are supported by brackets 24. Brackets 24, in turn, are adjustable in a direction perpendicular to the walls of channel 18 by means of screws 25 which support the bracket 24 and which are movable longitudinally of slots 43 provided in the brackets 24. These slots which may best be seen in Fig. 2, afford means for adjusting the pressure of rollers 21 against channels 18 to regulate the amount of force required to raise or lower housing 2.

Fig. 6 illustrates the stop and bumper arrangement provided to limit the upward travel of the housing 2. In this arrangement, a re-entrant leaf spring 44 is supported from the bolt and nut arrangement 32 both to guide the stop 30 into contact with the bumper 31 and to retain the stop in such engagement. This position of the stop, of course, corresponds to the position of maximum elevation of the housing 2 desired when a television picture is being received. Fig. 7 is a partial sectional view of the supporting and adjusting arrangement for rollers 28 provided for adjusting the screen 1 laterally, as previously described in the discussion of Fig. 5.

An important advantage of my invention is that it provides a retractable support for the viewing screen of a television receiver in which the screen may be placed out of sight when the receiver is not being used for the reception of television pictures and may be withdrawn to provide an enlarged view of a received picture when the receiver is in operation. The mounting is such that the entire viewing screen and associated parts may be raised into viewing position or lowered into the cabinet by a slight pressure of the operator's fingers. At the same time, the structure provides protection for the operator's fingers by arresting the lowering lid of the receiver cabinet prior to a position where it would descend upon the operator's fingers.

Another advantage of my invention is that it provides a construction in which the entire optical system is independently supported in a rigid structure, the optical members being completely adjustable to give accurate optical adjustment. The energizing circuits of the cathode ray tube are interlocked with the viewing screen elevating mechanism so that the face of the tube is illuminated only when the screen is in a position where all the optical elements are in focus.

While my invention has been described by reference to a particular embodiment thereof, it will be understood that numerous modifications may be made by those skilled in the art without departing from the invention. I, therefore, aim in the appended claim to cover all such equivalent variations as come within the true spirit and scope of my invention.

What I claim as new and desire to secure by Letters Patent of the United States is:

In a television receiver, a cabinet, a base portion rigidly fixed within said cabinet, vertical supporting members mounted on said base portion and a vertically movable housing supported by said supporting members, said movable housing having a plurality of brackets mounted thereon, said brackets having a plurality of rolling members fixed thereto and engaging said supporting members, means for adjusting said rolling members for aligning said movable housing with said base portion and counterweight means within said supporting members for facilitating vertical movement of said vertical housing.

ROBERT J. SHAW.

REFERENCES CITED

The following references are of record in the file of this patent:

UNITED STATES PATENTS

| Number | Name | Date |
|---|---|---|
| 398,391 | Hammond | Feb. 26, 1889 |
| 1,689,256 | Sapp | Oct. 30, 1928 |
| 2,086,643 | Shearer | July 13, 1937 |
| 2,259,393 | Roosenstein et al. | Oct. 14, 1941 |
| 2,350,889 | Harmon | June 6, 1944 |
| 2,404,943 | Beshgetoor | July 30, 1946 |
| 2,438,022 | Rundle | Mar. 16, 1948 |

FOREIGN PATENTS

| Number | Country | Date |
|---|---|---|
| 836,158 | France | Jan. 12, 1939 |